Oct. 29, 1929.  H. W. INGLE  1,733,987
TAKE-OUT MECHANISM
Filed April 24, 1925   5 Sheets-Sheet 3

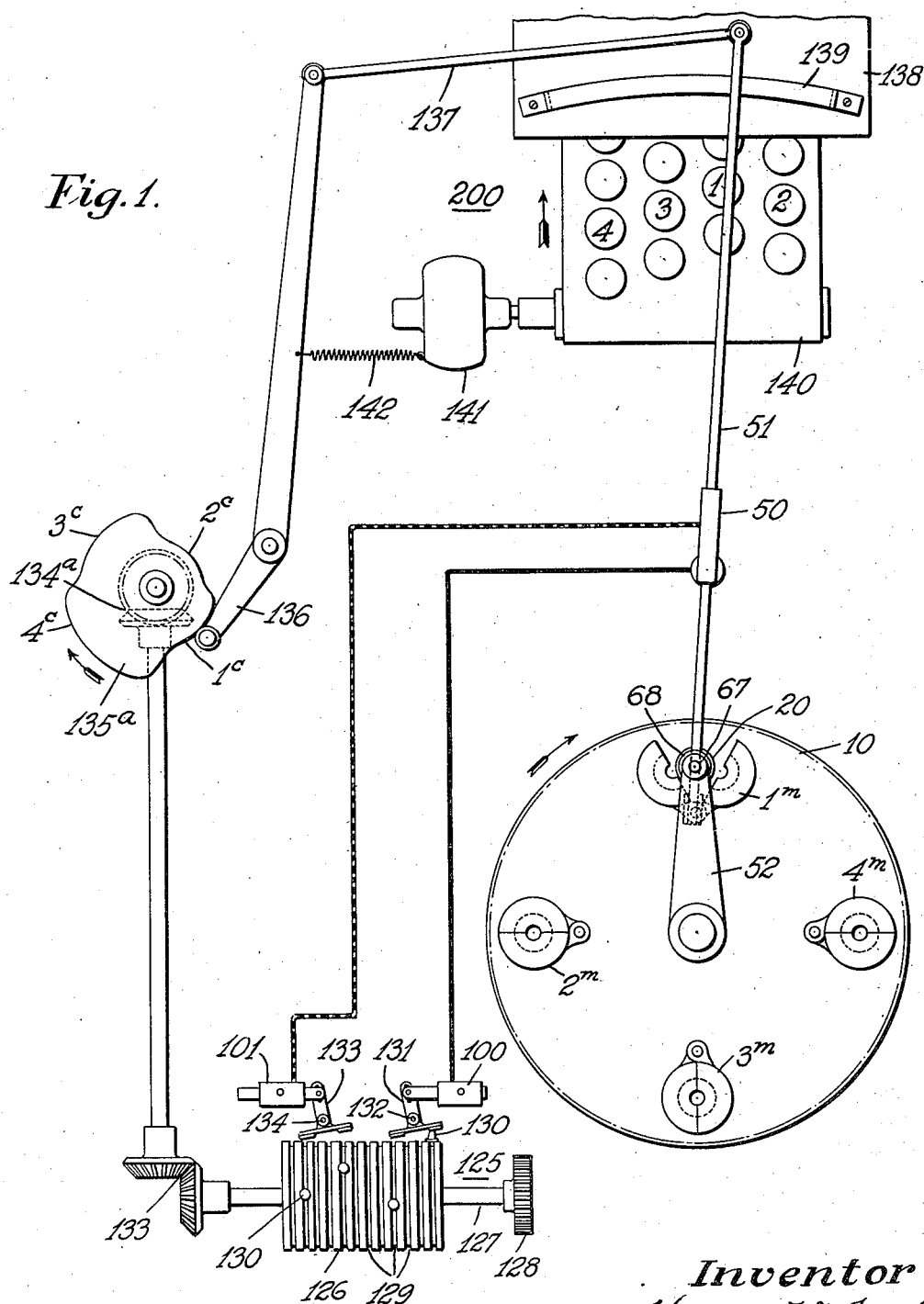

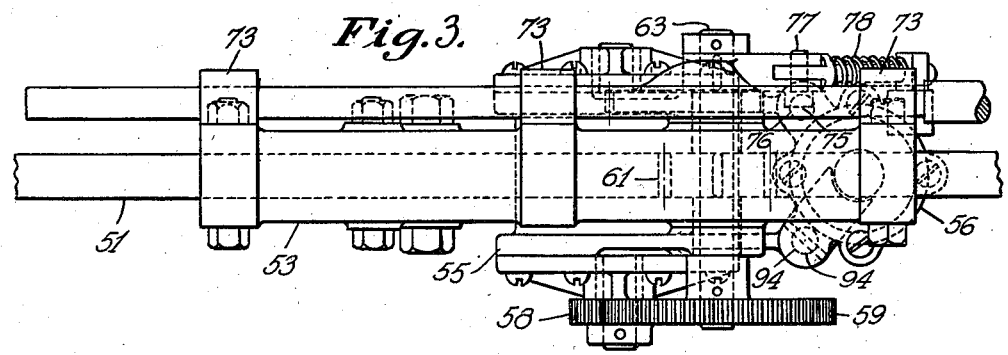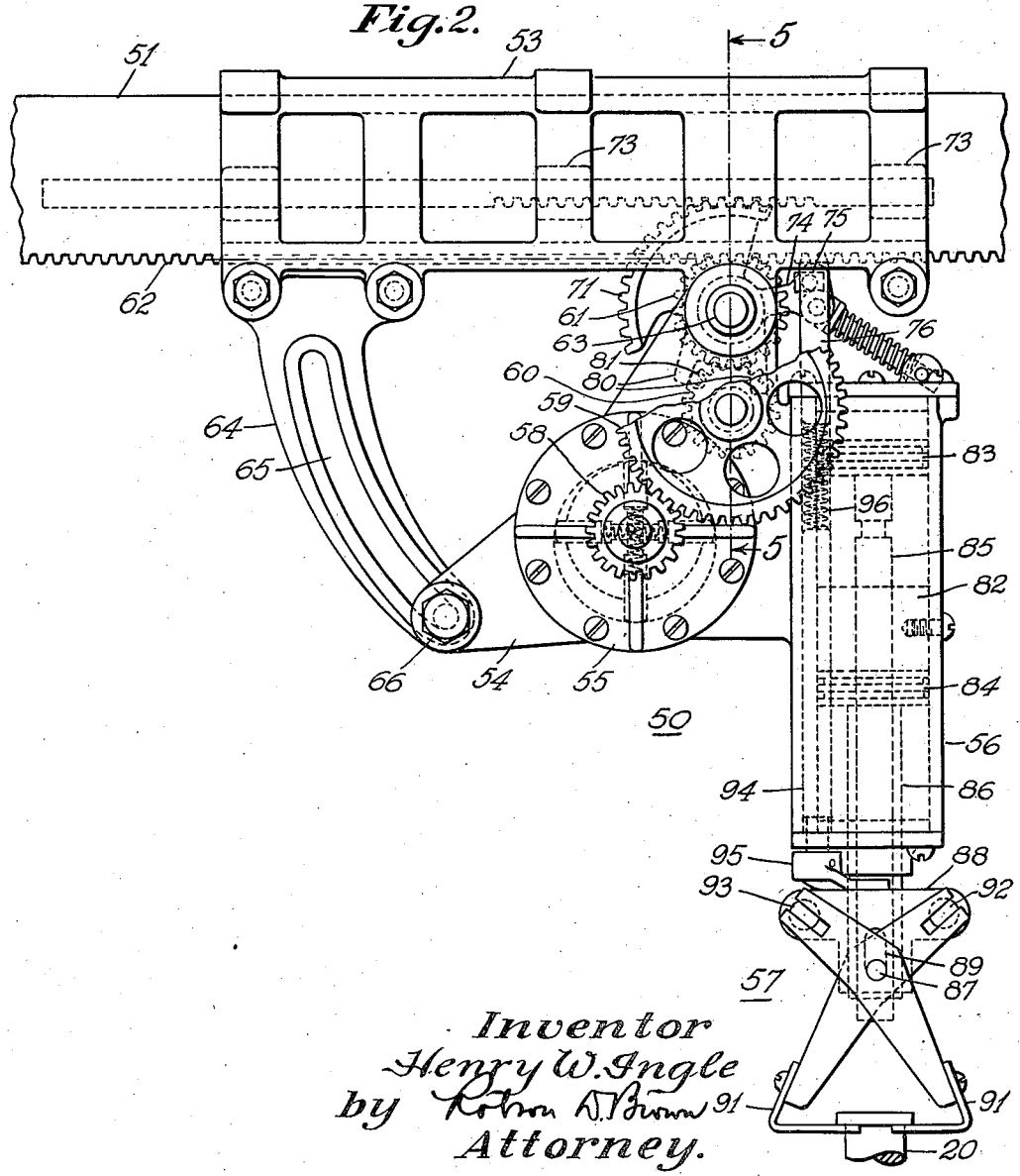

Inventor
Henry W. Ingle
by Robson A. Brown
Attorney

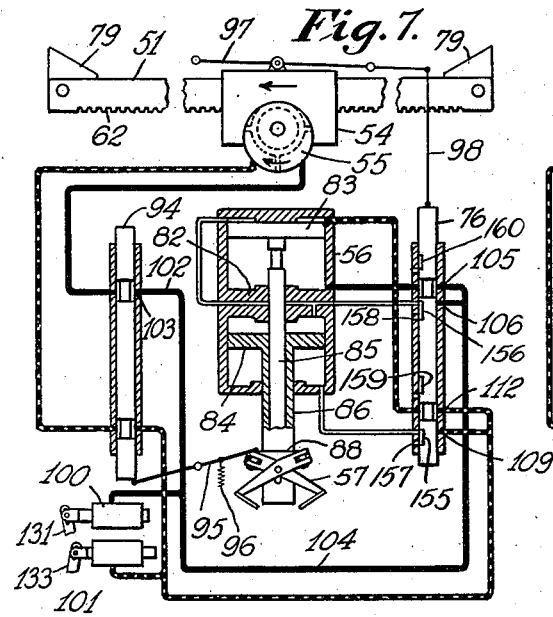
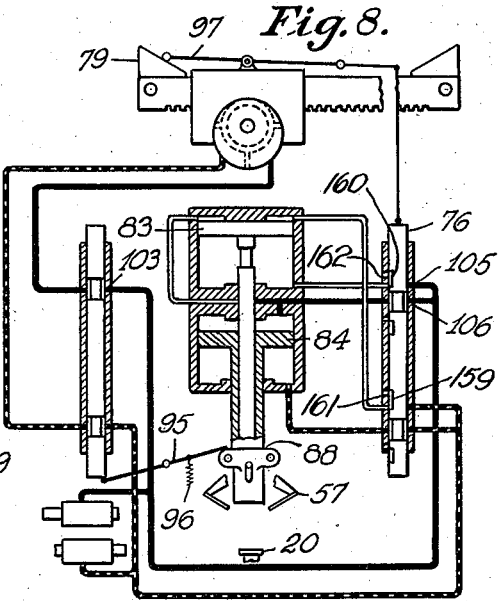
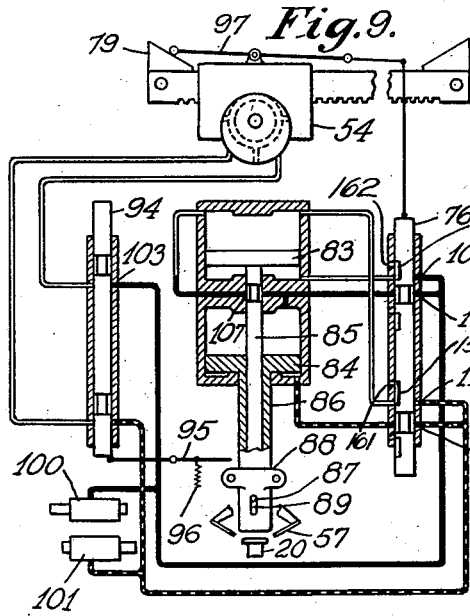
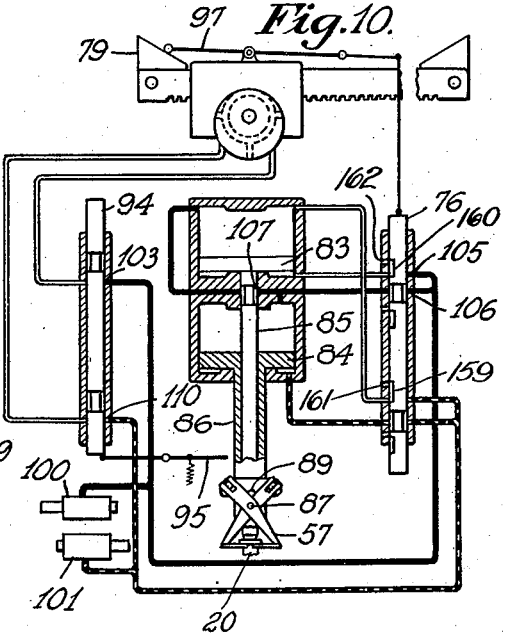

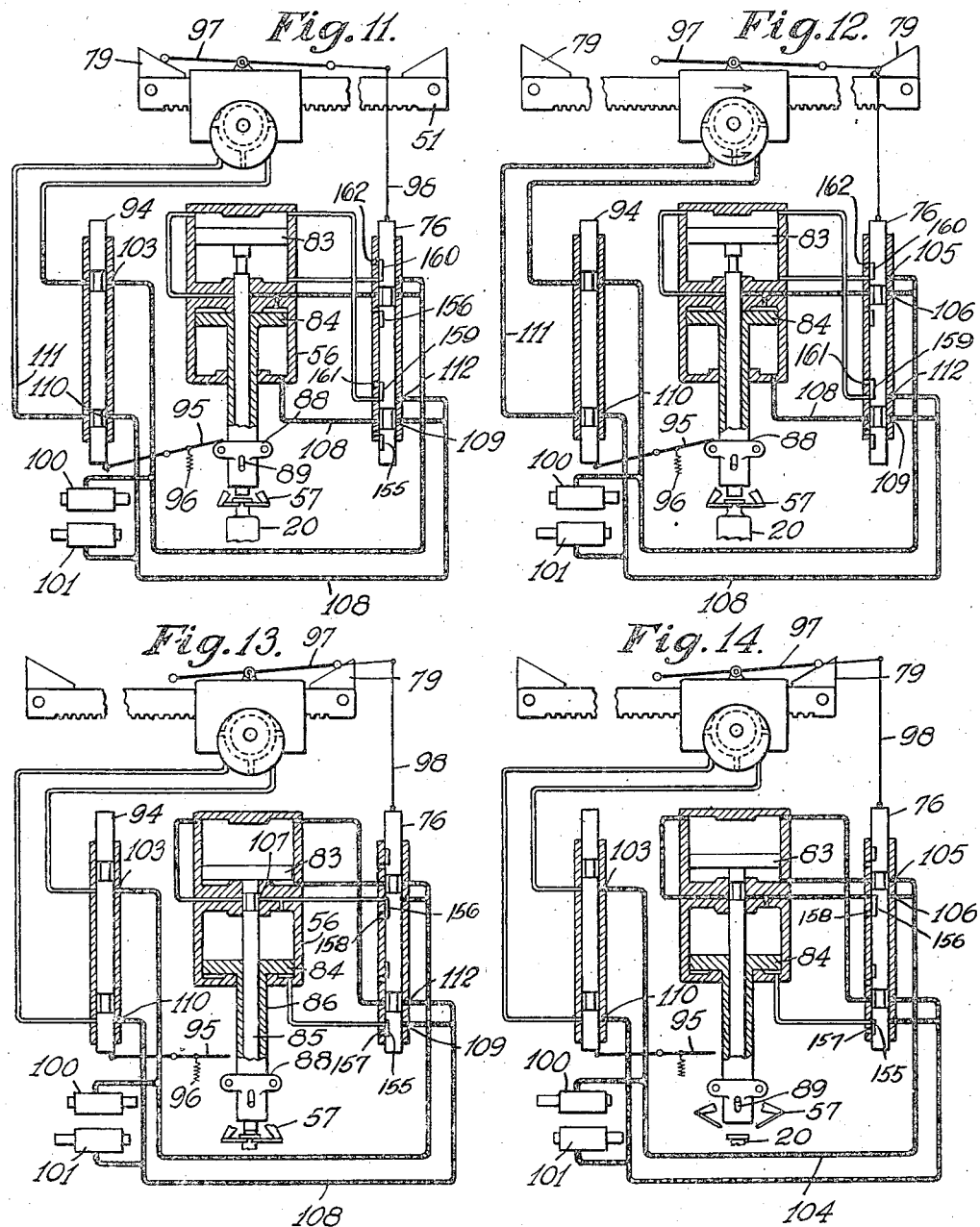

Patented Oct. 29, 1929

1,733,987

UNITED STATES PATENT OFFICE

HENRY W. INGLE, OF HARTFORD, CONNECTICUT, ASSIGNOR TO HARTFORD-EMPIRE COMPANY, OF HARTFORD, CONNECTICUT, A CORPORATION OF DELAWARE

TAKE-OUT MECHANISM

Application filed April 24, 1925. Serial No. 25,600.

My invention relates to the manufacture of glassware, and more particularly to a take-out apparatus arranged to take the finished ware from a glass forming machine and convey the same to a suitable ware-receiving mechanism.

The present invention has for an object to provide an automotive take-out mechanism, which shall be adapted to take ware from the forming machine, convey the same to a receiving station and place it at any desired portion of the station.

A further object of the invention is to provide apparatus of the character designated which shall be simple in operation and durable in construction, and which shall handle ware more efficiently than apparatus heretofore employed.

These and other objects will be more manifest from the following description, and specifically set forth in the appended claims.

In the drawing,

Figure 1 is a diagrammatic plan view of apparatus embodying the invention;

Fig. 2 is a side elevation of the take-out mechanism showing details of construction;

Fig. 3 is a top plan view of the apparatus shown in Fig. 2;

Figs. 7 to 14 are diagrammatic illustrations showing the operation of the take-out.

Figure 5:
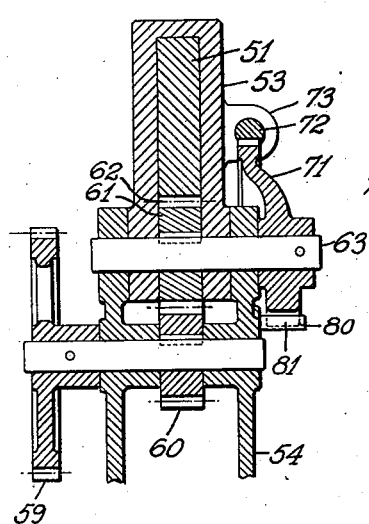
Fig. 5 is a partial view showing a section on line 5—5 of Fig. 2.
Figure 6:
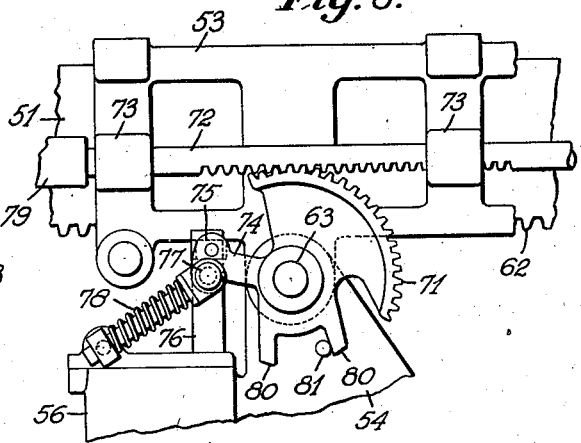
Fig. 6 is a front view in elevation, similar to Fig. 5.

In the commercial manufacture of shaped articles of glassware, it is desirable to coordinate the operation of the several associated machines, and thereby aid in the economical production of the finished product. The present invention contemplates an automotive take-out embodying a self-propelled carriage mechanism provided with suitable ware-gripping members that may be operated in timed relation with the shaping machine and auxiliaries to take an article from a mold of the machine and convey the same to a receiving station. The take-out also embodies apparatus adapted to direct the movement of the take-out in order that the articles may be placed at any desired portion of the receiving station in any predetermined sequence of operations. The placing of ware at the receiving station, hereinafter termed "stacking", may be effected automatically in sequence with the operation of the glass forming machinery, and the receiving station may be a conveyor, oven, lehr or any other suitable repository for further treating the formed glassware.

Referring to Fig. 1 of the drawing, the numeral 10 indicates a ware-forming mechanism of a conventional type, on which are mounted forming molds $1^m$, $2^m$, $3^m$, $4^m$ that may be operated in any well-known manner to form ware and discharge the same at predetermined intervals. While I have shown a machine of the rotary type having four molds, it is obvious that the invention may readily be adapted for use with any type of forming machine. The position at which these forming molds open to release the ware is hereinafter referred to as a delivery station.

Operatively associated with the forming machine 10 is a take-out mechanism 50 embodying features of the invention as hereinafter more fully described. The take-out mechanism is operated on a swinging track member 51, which is pivotally mounted at one end by a suitable support 52, which may form an integral part of the forming machine. The track 51 extends from the molds on the ware-forming machine to a ware-receiving station 200, which is hereinafter referred to and described as a lehr. It will be noted that the arrangement of the parts in such that the pivotal axis of the track and the center line of the mold at the delivery station are coincident at the time when the latter is opened for discharging formed ware. This construction provides a simple mechanism for positioning the take-out to take the article from the mold.

Figure 4:
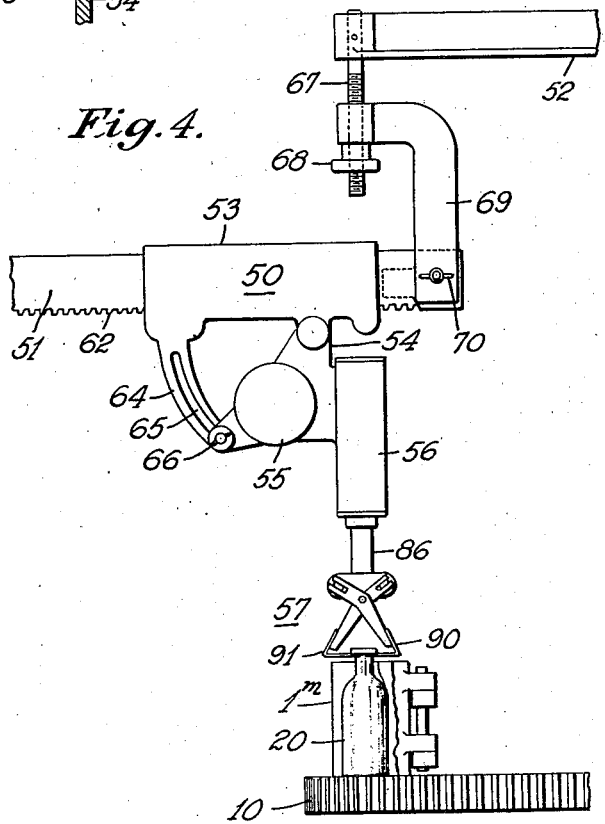
Fig. 4 is a front view in elevation of the take-out apparatus.

Referring to Figs. 2, 3 and 4 of the drawings, the take-out 50 embodies a self-contained automotive carriage apparatus, adapted to propel itself between the forming machine and the lehr and operating automatically to pick up, convey and deposit ware. This carriage comprises a support frame member 53 slidably mounted on the track 51. Suspended from the frame 53 is a casing 54 which contains a suitable motor 55 for propelling the take-out, and a cylindrical casing 56, containing aligned cylinders which are adapted to operate a suitable waregripping mechanism indicated at 57, as hereinafter described. As shown, these casing members are preferably arranged to form a compact integral unit.

While the carriage and the gripping device may be operated by any convenient type of motor, I preferably utilize a fluid operated motor and fluid pistons operating within the aligned cylinders to manipulate the ware-gripping device. The operation of glassware shaping machines usually requires compressed air, and the application of this fluid to operate the take-out motor and the pistons provides a convenient source of power. The compressed air in some instances is distributed to the various places of application by means of a suitable controller. By connecting the air supply with the motor and pistons, I provide a ready means to coordinate the operation of the air operated devices. Power is transmitted from the motor to the track by suitable reduction gearing 58, 59, 60 and 61. In the preferred construction, the gear 61 engages rack teeth 62, provided in the lower portion of the rack 51. This construction permits the carriage to be given a positive movement, so that its position on the track may be accurately controlled in its travel between the ware delivery and ware-receiving stations.

The casing unit 54 is pivotally suspended from the frame 53 by a pin 63. At the forward end of the casing 53 is a depending projection 64 provided with an arcuate slot 65 in which the forward end of the casing 54 is adjustably secured by a nut 66. This arrangement permits the grippers 57 to be adjusted to and then maintained in a vertical position, irrespective of the track inclination which may be caused by any difference in elevation between the ware delivery and ware-receiving stations. The track 51 is pivotally suspended from the support 52 at the ware-receiving station by a rod 67 (Fig. 4) provided at its lower extremity with a threaded adjusting nut 68. This nut pivotally supports an arm 69 which is pivotally secured to the track by a suitable bolt and nut member 70. By the above construction, the vertical adjustment of the track 60 may be readily effected to adapt the take-out to different mold heights.

As shown in Fig. 4, the take-out mechanism is positioned to take an article 20 from the open mold on the forming machine.

The operating mechanism connecting the motor 55 and the several valve mechanisms controlling the flow of fluid to the operating cylinder 56, comprises a segment gear 71 mounted at the suspension axis 63 and arranged to engage a rack bar 72 slidably mounted in bearings 73, 73 provided in the frame 52. The segment gear 71 is provided with an arm 74 which is pivotally connected by a pin and slot connection 75 to a piston valve stem 76. The valve piston projects from within the cylinder 56 and is positively reciprocated by the movement of the segment gear 71. This arm 74 is also pivotally connected by a pin 77 to an overthrow spring mechanism 78 which is adapted to retain the segment gear 71 and the valve piston 76, in either of two extreme positions to which it may be moved by the engagement of rack bar 72, with a suitable stop 79 located on the track 51. These stops may be provided on the track at places where it is desired to pick up or deposit articles. The segment gear 71 is further provided with spaced projections 80, 80 arranged to engage a stop pin 81 located on the casing 54, and thus accurately limit the movement of the gear and the valve stem.

The cylinder casing 56 for supporting and operating the take-out ware-gripping device 57 is divided by a partition 82 into two separate power cylinders provided with upper and lower reciprocating pistons 83 and 84 respectively.

As shown, a piston rod 85 reciprocated by the upper piston 83 is concentric to and operates within a hollow piston rod 86 which is connected to the lower piston 84. The lower extremity of outer piston rod 86 carries a sleeve shoulder member 88, which is provided with a slot 89 adapted to engage the pin 87 fixed in the inner rod 85 and thus limit the relative movement of the concentric piston rods. The pin 87 also pivotally supports suitable ware-gripping tong members 90 and 91. The upper extremities of these tongs are arranged to slidably engage suitable pin members 92 and 93 provided on the shoulder member 88. From the above construction it will be noted that the relative vertical movement of the two concentric piston rods reciprocates the pin 87 in the slot 89 and thus causes the members 90, 91 to fulcrum about the pivot pin 87 and effect the desired manipulation of the gripping members.

To provide for further manipulation of the fluid-operated motor 55, a control valve piston 94 projects from the lower portion of the cylinder 56. The lower extremity of this piston is provided with a projecting arm 95 adapted to engage the shoulder member 88 in its reciprocatory movement. The valve piston 94 is given a downward movement by a compression spring 96 located in the upper portion of the valve structure.

The operation of the take-out may be more clearly described by reference to the diagrammatic representations shown in Figs. 7 to 14 inclusive. For purposes of illustration, the take-out carriage 54 is indicated in Fig. 7 as moving to the left to pick up an article of glassware 20. In this position, fluid under pressure is admitted to the pressure system, indicated by heavy solid lines, by a control valve 100 and simultaneous with this operation exhaust from the system indicated by heavy dotted lines is provided through a coacting control valve 101. In practicing the invention, it is contemplated to coordinate the operation of these valves with the ware-forming machine, by means of any suitable fluid pressure control therefor.

The flow of fluid admitted to the system by control valve 100 is divided, a portion being conducted by a conduit 102 indicated by the solid line, through a port 103, to operate the motor to propel the take-out carriage between the stations. The fluid pressure to the motor is directly controlled by the spring pressed valve piston 94 which is operated by the movement of the shoulder member 88. The other portion is conducted by a conduit 104, indicated by the solid line, through a port 105. This port is controlled by valve piston 76, and fluid is permitted to flow to the underside of piston 83 and cause the same to be retained in raised position and thereby causing the ware-gripping device to be raised and the gripping member to be maintained in an open position. During the upward movement of piston 83, piston 84 is likewise moved upwardly by the inter-engagement of the piston rods 85 and 86 adjacent to the tongs 57 and it is necessary to provide for the admission of air beneath the piston 84 to prevent a vacuum being formed in the lower part of the cylinder and to provide for the exhaust of trapped air between the piston 84 and the upper head of its cylinder. These results may be obtained by forming suitable grooves 155 and 156 in the valve rod 76 extending between the ducts leading to the respective ends of the lower cylinder and suitable apertures formed in the sleeve surrounding the valve member 76 and indicated at 157 and 158 respectively. The segment 71 and rack 72 are indicated diagrammatically by a lever 97 pivotally mounted on the carriage 54 and connected to the valve stem 76 by a link member 98. When the carriage reaches the extreme left (Fig. 8), the lever 97 engages the stop 79 and causes the piston valve 76 to be forced downward, thereby closing port 105 and simultaneously opening port 106 which admits fluid to the upper side of piston 84. Admission of fluid above the piston 84 causes the same to travel downward, carrying with it, by means of the pin-and-slot mechanism, the upper piston 83, thus lowering the gripping devices in their present open position. During the downward movement of the lower piston 84 and simultaneous movement of the upper piston 83, as described above, provision must be made for venting the spaces above and below the upper piston, which may be done by grooves 159 and 160 formed in the valve member 76 and adapted to open communication, as shown in Fig. 8, between the spaces above and below the piston and the outer atmosphere through the ports 161 and 162 formed in the sleeve in which the valve member 76 operates. While the parts are at the position shown in Fig. 8, the grooves 155 and 156 are out of registry with any of the pressure or exhaust pipes, and, therefore, do not interfere with the normal operation of the device as explained herein. Similar venting action takes place in the other several positions shown in Figs. 9 to 14. The apertures 157, 161, 158, 162 are relatively small, preferably being of the order of magnitude of $\frac{1}{32}$ of an inch, so that even though they are open, as shown in Fig. 10, during the time pressure is applied to the space above the piston 83, it will be moved downwardly due to the fact that the pressure inlet opening is sufficiently larger than the vent 161. This venting might also be accomplished by boring small holes in the upper and lower cylinders respectively above and below the pistons 83 and 84 and permitting the exhaust of pressure through such holes even during the time pressure is applied to that portion of the respective cylinders; or it might also be accomplished by providing a relatively loose fit of the valve member 76 within its sleeve, so as to permit leakage in or out as might be necessary to vent either one cylinder during the positive movement of the piston therein by fluid pressure applied to the other cylinder. When the lower piston 84, provided with the shoulder member 88, travels downwardly, the spring-pressed valve piston 94 is released, and the spring 96 causes the valve to shift and close port 103 and shut off fluid from the motor. Simultaneous with extreme downward movement of the piston 83, a port 107, controlled by the movement of piston rod 85, is opened (Fig. 9) to admit fluid to the upper side of piston 83, thus causing the same to have a further downward movement limited by the extent of the slot 89. This final relative movement of piston rods 85 and 86 causes the gripping devices to close, as shown in Fig. 10.

At this period in the cycle of operation, the valve 100 is operated to form an exhaust for the system, and the valve 101 opened for admitting fluid under pressure, Fig. 11. It will be observed that the heavy lines previously shown as pressure lines are now shown as exhaust lines for the system. The fluid supply from the valve 101 is also divided, and a portion thereof is conducted by a conduit 108, through a port 109 which is also controlled by the valve piston 76, to the underside of piston 84. This causes the lower piston 84 to rise and carry with it the upper piston with the gripping device holding the ware, Fig. 11. As the piston 84 travels upward, the shoulder 88 engages the arm 95 of the spring pressed valve 94 and causes the same to open a port 110 and allow fluid to flow through a conduit 111 to operate the motor in a reverse direction, thus causing the take-out carriage to move to the right, as indicated in Figs. 11 and 12. The arrangement of ports is such that the valve 94 is operated to admit fluid to the motor when the ware-gripping devices are in the raised position, thus insuring the ware to be gripped or released before the carriage starts on its travel between the stations. During this continued movement of the carriage, the lower piston 84 is maintained in its raised position in the cylinder, and the upper piston 83 lags by an amount equal to the length of the slot 89, thus holding the gripping members closed to hold the article. This relation is maintained until the bar 97 engages the stop 79 and causes the valve piston 76 to shift in a reverse position to close the port 109 and simultaneously open a port 112 and admit fluid to the upper side of piston 83 thus causing the same to move downward and lower the article as indicated in Fig. 13. At this period in the cycle of operation, Fig. 14, valve 101 is closed to shut off the fluid and form an exhaust for the system, and valve 100 is opened to admit fluid, as previously described. Fluid is admitted through conduit 104 through port 105 of valve piston 76 to admit fluid on the underside of piston 83, and cause it to raise by the extent of slot 89 and thus manipulating the gripping devices to open and release the article. Simultaneous with this operation, the piston 83 continues to travel upward and engage the arm 95 and shift valve piston 94 to open port 103 and admit fluid to the motor and thus start it in a reverse direction to automatically repeat the cycle of operation, as described.

For the purpose of illustrating the invention, I have shown diagrammatically in Fig. 1 a conventional type of forming machine having four molds associated with a suitable control device 125, which is adapted to coordinate the movement of the take-out therewith. The valves for controlling the flow of fluid for the various operations in a glass shaping machine are manipulated in any desired timed relation by a revolving drum provided with pins in the periphery thereof which are adapted to operate designated valves at the desired times. A control of the above type is shown and specifically described in my copending application Serial No. 735,079, filed August 30, 1924.

The present invention contemplates the application of a similar control for actuating the valves 100 and 101. The control comprises essentially a drum 126 mounted on a shaft 127 and may be independently operated by any convenient source of power indicated by gear 128. The drum 126 has provided in the periphery thereof a plurality of circumferential grooves 129 in which are mounted studs 130. These studs are mounted in such a manner that they may be readily adjusted circumferentially in the slots so as to produce the desired sequence of operation. For the purpose of illustration, the valve 100 is actuated by a lever 131 pivotally mounted at 132. Similarly, a lever 133 pivotally mounted at 134 operates control valve 101.

From the above description it will be noted that the carriage may be stopped at any desired position on the track 51 by shutting off the air supply to the motor 55, and this may be readily accomplished by providing a valve actuating stud on the revolving drum 126. In practicing the invention, the valve actuating devices on the drum are timed with the operation of the shaping machine and to provide ample time for the operation of the take-out, the carriage may be advanced nearly to the mold and stopped by merely shutting off the power, and then at the proper time be advanced and take the ware from the mold in the manner heretofore described. This control arrangement readily adapts the take-out to a wide range of operations where it is desirable to comply with certain time interval conditions in the cycle of operation.

The mechanism for directing the lateral movement of the take-out relative to the receiving station is illustrated by the cam mechanism indicated at 135$^a$. This cam member is provided with cam surfaces indicated by numerals 1$^c$, 2$^c$, 3$^c$, 4$^c$. The cam may be operated in any suitable manner, for example, it may be rotated directly by the controller 125 through suitable shaft and gear connections indicated at 133 and 134$^a$. The cam surfaces engage a bell crank lever 136 which connects with the extremity of the take-out track 51 by a link 137. The track may be termed the stacker arm. The bell crank 136 is maintained in engagement with the cam surfaces by a suitable spring 142. To facilitate the movement of this stacker arm across the lehr 138, a guide rest 139 is provided on the top portion thereof. Projecting from the front portion of the lehr housing is a conveyor mechanism indicated by numeral 140, which may be given a continuous motion by any suitable means, as for example, the motor indicated at 141.

In the foregoing illustrations I have described the control mechanism 125 as being independently operated to regulate the flow of air to the take-out mechanism in timed relation with the shaping machine. It is obvious that the controller may be connected in various ways to give the desired sequence of operation between the several mechanisms employed in producing shaped articles of glassware.

Having thus described apparatus constructed in accordance with the invention, the operation thereof is carried out in the following manner.

Referring to the showing in Fig. 1, the mold $1^m$ is opened to discharge a shaped glass article, and the automotive take-out mechanism 50 is supplied with motive fluid by the master controller 125, which is operated in timed relation with associated apparatus. As heretofore described, the automatic carriage advances to the mold, the gripping devices carried thereby are lowered to engage the article of glassware and lift it; the carriage then travels with the ware to the receiving station where it is deposited and released by the gripping members, and the carriage then returns to the mold to repeat the cycle of operation of taking ware from a mold and depositing the same at any desired place on the receiving station.

In the particular embodiment of the invention, the receiving station is indicated as a lehr provided with a continuously moving conveyor mechanism 140, adapted to receive ware in longitudinal rows. Articles may be deposited regularly in the rows by moving the stacker arm 51 transversely back and forth over the conveyor in several periodic steps.

In the preferred arrangement, the cam member $135^a$ is designed so as to give the desired range of motion to the stacker arm 51 in its transverse motion across the width of the conveyor. The several cam surfaces are arranged to impart the desired intermittent oscillatory motion of the stacker arm during its transverse travel. For the purposes of illustration, the cam surfaces $1^c$, $2^c$, $3^c$, $4^c$ relate to the similarly numbered designated articles on the conveyor and also to like numbers designating molds at the forming machine. The schematic representation illustrates a desirable coordination of the several machines, and it is obvious that various arrangements of articles on the lehr may readily be effected by employing a different design of cam. It may also be desirable to change the cam action in accordance with the various size articles to be handled by the apparatus. From the above description it will be noted that by changing the design of cam, the take-out may readily be adapted to a wide variety of applications.

As indicated in Fig. 1 of the drawing, the cycle of operation indicates an article from mold $1^m$ placed at position 1 by the stacker arm, which is directed by the movement of the bell crank engaging cam surface $1^c$. The cam rotating in clockwise direction in timed relation with molds of the shaping machine, causes the cam surfaces $2^c$ to engage the bell crank and move the stacker arm in a further transverse direction to position 2 on the lehr and in timed relation to enable the carriage take-out to take an article from mold $2^m$ and place it at the designated position on the conveyor. Cam surface $3^c$ now engages the be.l crank and by its particular design causes the stacker arm to move in a reverse direction, passing over the row of the previously placed articles and causing said arm to be positioned over space 3 on the lehr in time for the take-out to place an article from $3^m$ mold. In a similar manner the cam surface $4^c$ causes the stacker arm to move to 4 position on the lehr and deposit the article from the $4^m$ mold. Thus the product of every mold has a designated place on the conveyor, and all the articles delivered from a mold may be readily inspected upon delivery from the lehr. The particular feature of routing articles through the lehr provides a ready means for ascertaining the quality of product delivered by each mold. By the particular cam arrangement causing the stacker arm to oscillate backward and forward during its travel transversely of the conveyor, the arcuate swing of the stacker arm between successive deliveries, may be reduced to a minimum. As above described, it will be noted that the maximum arc of swing to deposit an article includes three longitudinal rows and articles may be deposited in the several rows in any desired sequence to form a transverse row. It is obvious that various cam arrangements may be effected to give any desired range of motion to the stacker arm to cause the same to place articles at any particular location on the conveyor.

Though a "takeout" device is particularly shown and described in this application, it is obvious that the inventions have utility when applied as transfers and the term "takeout" where used in the specification and claims is to be construed, unless otherwise limited by the context, as including transfer mechanisms.

Having thus described apparatus constructed in accordance with the present invention, I desire that it be understood that various changes and modifications may be made therein without departing from the scope of the appended claims.

What I claim is:

1. The combination with a glass shaping machine, of a take-out embodying an automotive carriage mechanism, means for operating said carriage between a ware-delivery station and a ware-receiving station, and means associated with the shaping machine for controlling the movement of the carriage.

2. The combination with a glass shaping machine, of a take-out embodying an automotive carriage mechanism, means for operating said carriage between a ware-delivery station and a ware-receiving station, and means associated with the shaping machine for starting and stopping the movement of the carriage at or near the stations.

3. The combination with a glass shaping machine, of a pneumatically operated take-out embodying an automotive carriage mechanism, means for operating said carriage between a ware-delivery station and a ware-receiving station, cooperating ware-gripping members mounted on the carriage, means for operating the gripping members, and means associated with the shaping machine for controlling the operation of the carriage and the gripping members.

4. The combination with a glass shaping machine, of a pneumatically operated take-out embodying an automotive carriage mechanism, means for operating said carriage between a ware-delivery station and a ware-receiving station, cooperating ware-gripping members mounted on the carriage, means for operating the gripping members, and timing mechanism associated with the shaping machine for controlling the operation of the carriage and the gripping members at the stations.

5. The combination with a glass shaping machine, of a take-out embodying an automotive carriage mechanism, means for operating said carriage between a ware-delivery station and a ware-receiving station, a timing mechanism associated with the shaping machine for regulating the movement of the carriage mechanism between the stations, and means operated in synchronism with the shaping machine for automatically and periodically changing the lateral position of the carriage mechanism at one of the stations.

6. The combination of glassware shaping mechanism which includes a finishing mold, a ware receiving station, a pneumatically operated automotive take-out mechanism adapted to take ware from the mold, transfer and deposit the same at the receiving station, and a timing mechanism associated with the shaping mechanism for controlling the operation of the take-out mechanism.

7. The combination of glassware shaping mechanism which includes a finishing mold, a ware receiving station, an arm pivoted at the mold and extending to said receiving station, a pneumatically operated ware take-out means carried by the arm, and an adjustable rotary timer for controlling each operation of the take-out mechanism independently of the other operations thereof.

8. The combination of a glass shaping machine having a mold, an arm pivotally mounted in axial alignment with the mold and extending from the mold to a ware delivery station, a take-out device mounted for movement longitudinally of said arm and having a power unit movable as an entirety therewith and in operative engagement with said arm for propelling said device along said arm to transfer ware from the mold to said delivery station, and means for adjusting the height of the pivotal mounting of said arm relative to that of said mold.

9. The combination of a glass shaping machine having a mold, an arm pivoted in axial alignment with the mold and extending to a ware delivery station, a take-out device mounted for movement longitudinally of said arm and having a power unit movable as an entirety therewith and in operative engagement with said arm for propelling said device along said arm to transfer ware from the mold to said delivery station, and means for adjusting the height of said arm relative to the mold and said delivery station.

10. The combination of glassware shaping mechanism which includes a finishing mold, a ware receiving station, an arm pivoted at the mold and extending to said receiving station, take-out means including ware gripping members carried by the arm, and means for adjusting the axis of the gripping members relative to the inclination of the arm.

11. The combination of a glass shaping machine having a mold, an arm pivoted in axial alignment with the mold and extending from the mold to a ware delivery station, a take-out device mounted for movement longitudinally of said arm and having a power unit movable as an entirety therewith and in operative engagement with said arm for propelling said device along said arm to transfer ware from said mold to said delivery station, means for adjusting the angle of inclination of said arm to compensate for difference in levels between said mold and said delivery station, and means for effecting the vertical alignment of the axis of the take-out device and the gripping members relatively to that of the mold.

12. The combination of a glass shaping machine having a mold, an arm extending from the mold to a ware delivery station, a take-out device mounted for movement longitudinally of said arm and having a power unit movable as an entirety therewith and in operative engagement with said arm for propelling said device along said arm to transfer ware from the mold to said delivery station, and means for adjusting the angle in inclination of said device relative to that of said arm.

13. The combination of glassware shaping mechanism including a mold, a ware-receiving station, an arm pivoted at the mold and extending to said receiving station, take-out means including ware gripping devices carried by the arm, and means operated in timed relation with the shaping mechanism for moving the arm across the ware receiving station in successive transverse movements of unequal lengths and operating the gripping devices.

14. The combination of glassware shaping mechanism including a mold, a ware-receiving station, an arm pivoted at the mold and extending to said receiving station, take-out means carried by the arm, and means controlled by the shaping mechanism for moving the arm across the ware receiving station in successive transverse movements of unequal lengths, and operating the take-out at predetermined intervals.

15. A glass forming machine embodying a mold, an arm pivoted at the mold, a rack gear associated with the arm, an automotive take-out engaging the rack, and means associated with the forming machine for controlling the movement of the arm and the take-out.

16. A glass forming machine embodying a mold, an arm including a rack gear arm pivoted at the mold, an automotive take-out carried by the arm and engaging the rack, and means associated with the forming machine for controlling the movement of the take-out and the arm.

17. A glass forming machine embodying a mold, a movable arm provided with a rack gear and pivoted at the mold, an automotive take-out mechanism carried by the arm and provided with means for engaging the rack, and means associated with the forming machine for controlling the movemeet of the take-out on the arm and the movement of the arm.

18. In combination with a glass shaping machine having a mold, an arm pivoted at the mold and extending to a receiving station, a take-out device mounted for movement longitudinally of said arm and having a pneumatically operated power unit movable as an entirety therewith and in operative engagement with said arm for propelling said device therealong to transfer ware from a mold to said delivery station, and means operated in timed relation to a shaping machine for simultaneously swinging said arm about its pivot and controlling the admission of fluid pressure to said device.

19. Apparatus for handling glassware comprising a continuously moving conveyor, means moving transversely of the conveyor in successive transverse movements of periodically changing lengths for depositing articles on said conveyor in substantially transverse rows, said means being arranged to deposit an article in a row at each movement.

20. Apparatus for handling glassware comprising a continuously moving conveyor, means moving transversely of the conveyor in a series of transverse movements of periodically changing lengths for depositing articles on said conveyor in substantially transverse rows, said means being arranged to deposit an article in a row at each movement.

21. A glass forming machine embodying a mold, an arm pivoted at the mold, an automotive take-out carried by the arm, means for causing the arm to advance transversely across the conveyor in successive movements of unequal lengths, and means associated with the forming machine for controlling the movement of the arm and the take-out.

22. In the manufacture of glassware, the combination of a glassware shaping machine, an annealing lehr, an arm pivoted at the shaping machine and extending to the lehr, means carried by the arm for transferring ware from the shaping machine to the lehr, and means for advancing the arm transversely of the lehr in a series of transverse movements of periodically changing lengths.

23. In the manufacture of glassware, the combination of a glassware shaping machine, an annealing lehr, an arm pivoted at the shaping machine and extending to the lehr, means carried by the arm for transferring ware from the shaping machine to the lehr, means for advancing the arm across the lehr in successive transverse movements of unequal lengths, and means associated with the shaping machine for simultaneously controlling the movement of the transfer means and the movement of the arm.

24. The combination of a glass shaping machine having a mold, an arm pivoted at the mold for horizontal swinging movement and extending from the mold to a ware delivery station, a take-out device mounted for movement longitudinally of said arm and having a fluid pressure power unit movable as an entirety therewith and in operative engagement with said arm for propelling said device along said arm to transfer ware from the mold to said delivery station, means actuated by the movement of said device for reversing its direction of movement along said arm, and means controlled by the operation of the shaping machine for controlling the swinging movement of said arm, the travel of said device on the arm and the operation of said take-out device.

25. In apparatus of the kind described, a mold, a fluid operated automotive carriage mechanism adapted to travel toward and from the mold, said carriage including a cylinder, a piston within said cylinder, a second cylinder associated with the first cylinder and aligned therewith, a piston in said second cylinder, the piston rod of said first cylinder passing through the piston rod of the second cylinder, vertically disposed ware-gripping tongs pivotally mounted at the lower extremity of one of the piston rods, tong-actuating means carried by the other piston, means operated by the vertical movement of the tongs for controlling the movement of the carriage, and means operated by the travel of the carriage for controlling the flow of fluid to the pistons for operating the gripping members at the mold.

26. In apparatus of the kind described, a mold, a take-out comprising a carriage adapted to travel toward and from the mold, a power unit movable as an entirety with said carriage to propel it toward and away from said mold, fluid pressure operated ware engaging tongs on said carriage for removing the ware from the mold, valve mechanism movable with the carriage and actuated by the movement thereof for controlling the operation of the tongs.

27. In apparatus of the kind described, a mold, an arm extending from the mold to a ware delivery station, a take-out carriage mounted on said arm for movement longitudinally thereof, a fluid pressure motor mounted on said carriage and movable as an entirety therewith for propelling said carriage along said arm, vertically movable ware engaging tongs mounted on said carriage for transferring ware from the mold to said delivery station, and means actuated by the vertical movement of the tongs for controlling the operation of said motor.

28. In apparatus of the kind described, a mold, a track extending from the mold to a delivery station, a take-out carriage mounted on said track for movement longitudinally thereof, a motor mounted on said carriage and movable as an entirety therewith for propelling said carriage along said track, vertically movable ware engaging tongs mounted on said carriage for removing ware from the mold and transferring it to said delivery station, means actuated by the vertical movement of the tongs for controlling the operation of said motor, and means actuated by the movement for controlling the operation of said tongs.

29. In apparatus of the kind described, a mold, a track extending from the mold to a delivery station, a take-out carriage mounted on said track for movement longitudinally thereof, a fluid pressure motor mounted on said carriage and movable as an entirety therewith for propelling said carriage along said track, vertically movable ware engaging tongs mounted on the carriage for removing ware from the mold and transferring it to said delivery station, valve mechanism actuated by the vertical movement of the tongs for controlling the addition of fluid pressure to said motor, and valve mechanism actuated by the movement of the carriage for controlling the admission of fluid pressure to said tongs.

30. In combination with a glassware shaping machine and a receiving station, an automotive take-out carriage adapted to travel between the shaping machine and the receiving station, said carriage comprising a motor, a vertically disposed cylinder, a piston within said cylinder, a second cylinder associated with the first cylinder and aligned therewith, a piston in said second cylinder, the piston rod of said first cylinder passing through the piston rod of the second cylinder, ware-gripping tongs carried by the piston rods, means operated by the vertical movement of the tongs for controlling the movement of the carriage, and means operated by the travel of the carriage at the stations for controlling the operation of the tongs.

31. In combination with a glass shaping machine having a mold, a take-out device comprising a carriage, a motor mounted on said carriage and movable as an entirety therewith for moving said carriage toward and from said mold, a stationary rack, and a gear driven by said motor and in engagement with said rack-bar for propelling said carriage toward and from said mold.

32. In combination with a glass shaping machine having a mold, a take-out device comprising a carriage, a motor mounted on said carriage and movable as an entirety therewith for moving said carriage toward and from said mold, a fluid pressure cylinder mounted on said carriage and having a reciprocable piston, ware gripping tongs carried by said piston, means actuated by the movement of the tongs for controlling the movement of the carriage, and means actuated by the travel of the carriage for controlling the admission of the fluid pressure to the cylinder for operating the gripping members at the mold.

33. In combination with a glass shaping machine having a mold, a take-out device comprising a carriage, a motor mounted on said carriage and movable as an entirety therewith for moving said carriage toward and from said mold, a cylinder and a reciprocable piston mounted on said carriage, ware gripping tongs carried by the piston, valve means actuated by the movement of the tongs for controlling the movement of the carriage, and valve means actuated by the travel of the carriage for controlling the admission of fluid pressure to said cylinder.

34. In combination with a glass shaping machine having a mold, a take-out device comprising a carriage, a motor mounted on said carriage and movable as an entirety therewith for moving said carriage toward and from said mold, a pair of cylinders mounted on said carriage each having a reciprocable piston therefor, ware engaging tongs carried by the pistons, a valve member for controlling the admission of fluid pressure to and the exhaust of fluid pressure from each of said cylinders, and means actuated by the movement of the carriage for controlling the movement of the valve.

35. In combination with a glass shaping machine having a mold, a take-out device comprising a carriage, a motor mounted on said carriage and movable as an entirety therewith for moving said carriage toward and from said mold, a pair of aligned cylinders, mounted on said carriage, and each having a reciprocable piston rod therefor, one of said piston rods extending through the other, ware gripping tongs carried by the piston rods, a valve member for controlling the admission of fluid pressure to and the exhaust of fluid pressure from each of said cylinders, and means actuated by the movement of the carriage for controlling the movement of the valve members.

36. In combination with a glass shaping machine having a mold, a take-out device comprising a carriage, a motor mounted on said carriage and movable as an entirety therewith for moving said carriage toward and from said mold, ware gripping members mounted on said carriage, a fluid pressure cylinder and piston for actuating the gripping members, a valve for admitting fluid pressure to said motor and said cylinder, another valve actuated by the travel of the carriage for controlling the admission of fluid pressure to the cylinder and another valve actuated by the movement of the piston of said cylinder for controlling the admission of fluid pressure to said motor.

37. In combination with a glass shaping machine having a mold, a take-out device comprising a carriage, a motor mounted on said carriage and movable as an entirety therewith for moving said carriage toward and from said mold, ware gripping members mounted on said carriage, a pair of fluid pressure cylinders having reciprocable pistons for actuating said gripping members, a valve for admitting fluid pressure to the motor and the cylinders, another valve actuated by the travel of the carriage for controlling the admission of the fluid pressure to each of said cylinders and another valve actuated by the operation of the pistons for also controlling the admission of fluid pressure to said motor.

38. In combination with a glass shaping machine having a mold, a take-out device comprising a carriage, a motor mounted on said carriage and movable as an entirety therewith for moving said carriage toward and from said mold, a pair of cylinders mounted on said carriage and each having a reciprocable piston, ware gripping tongs carried by said piston, a pair of control valves for alternately admitting fluid pressure to and exhaust fluid pressure from said motor and said cylinders, a timing mechanism periodically actuating said valves, a valve member actuated by the travel of the carriage for also alternately controlling the admission of fluid pressure to and the exhaust of fluid pressure from each of said cylinders, another valve member actuated by the movement of the pistons for also alternately controlling the admission of fluid pressure to and the exhaust of fluid pressure from said motor and another valve actuated by the movement of one of the pistons for also controlling the admission of fluid pressure to and the exhaust of fluid pressure from its associated cylinder, said valve being operated in timed relation to cause a take-out to move continuously to and from said molds.

39. Takeout apparatus for removing glassware from molds, comprising ware-gripping tongs, means for imparting traveling movement to said tongs in a horizontal direction, means for raising and lowering the tongs at each end of their path of travel, and means controlled by the raising and lowering means, for closing said tongs when in their lower position at one end of the said path of movement, and for opening the tongs when in their lowermost position at the other end of the path of movement.

40. Apparatus for handling ware comprising ware gripping tongs, means for raising and lowering said tongs, and means responsive to the first named means for opening and closing said tongs, the whole being so constructed and arranged that the tongs may be maintained either open or closed in raised position.

41. Apparatus for handling ware comprising ware gripping tongs, means for raising and lowering said tongs, means responsive to the first named means for opening and closing said tongs, and means for moving said tongs in a lateral direction in raised position while either open or closed.

42. Apparatus for handling ware, comprising a track, a carrier on said track for transferring ware from the rear end of said track to the front end thereof, and means for shifting the forward end of the track laterally in a cyclic order to a plurality of stations at which the ware may be deposited, so that ware is delivered to any selected relative position on the lehr belt once only until after ware has been delivered to every other relative position in the cycle.

43. In combination with a lehr, a continuously moving conveyor belt therefor, means for transferring ware from a receiving station to said lehr, means for controlling the delivery position of the transfer, means to insure the placing of the ware transversely of the lehr in a cyclic order and to maintain the articles of ware in a plurality of columns longitudinally of said belt, and means to maintain the same predetermined distance between articles of ware in each of the said columns.

44. In combination, a continuously moving lehr conveyor, means for transferring ware from a receiving station to the lehr conveyor, means controlling the transfer, means for placing the ware in a cyclic order so that lines joining the axes of the articles of ware placed in each cycle will form transversely of the conveyor lines of regular predetermined design parallel to each other.

Signed at Hartford, Conn., this 23rd day of April, 1925.

HENRY W. INGLE.